(12) United States Patent
Kindl et al.

(10) Patent No.: US 9,366,177 B2
(45) Date of Patent: *Jun. 14, 2016

(54) SUPERCHARGED INTERNAL COMBUSTION ENGINE WITH TWO-CHANNEL TURBINE AND METHOD (71) Applicant: Ford Global Technologies, LLC, Dearborn, MI (US)

(72) Inventors: Helmut Matthias Kindl, Aachen (DE); Norbert Andreas Schorn, Aachen (DE); Vanco Smiljanovski, Bedburg (DE); Rob Stalman, Selfkant (DE); Franz Arnd Sommerhoff, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

This patent is subject to a terminal disclaimer.

(21) Appl. No.: 14/167,884

(22) Filed: Jan. 29, 2014

(65) Prior Publication Data

US 2014/0230431 A1    Aug. 21, 2014

(30) Foreign Application Priority Data

Feb. 20, 2013   (DE) ................... 10 2013 202 744

(51) Int. Cl.
*F02D 23/00*   (2006.01)
*F04D 29/44*   (2006.01)
(Continued)

(52) U.S. Cl.
CPC .............. *F02B 37/001* (2013.01); *F01D 9/026* (2013.01); *F01D 17/18* (2013.01); *F02B 37/025* (2013.01); *F02B 37/183* (2013.01); *F02B 37/22* (2013.01); *F02C 6/12* (2013.01); *F05D 2210/43* (2013.01);
(Continued)

(58) Field of Classification Search
CPC .... F02B 37/025; F02B 37/18; F02B 37/1873; F02B 37/183; F01D 9/026; F02D 2220/40; Y02T 10/144
USPC .......... 60/602; 415/146, 147, 148, 205, 211.1
See application file for complete search history.

(56) References Cited

U.S. PATENT DOCUMENTS 2,730,861 A * 1/1956 Buchi ............................ 415/205
3,313,518 A * 4/1967 Nancarrow ................... 415/205
(Continued)

FOREIGN PATENT DOCUMENTS

DE           19740609 A1    12/1998
DE        102004055571 A1    6/2006
(Continued)

OTHER PUBLICATIONS

Kindl, Helmut M. et al., "Supercharged Internal Combustion Engine With Two-Channel Turbine and Method for Operating an Internal Combustion Engine of Said Type," U.S. Appl. No. 14/167,933, filed Jan. 29, 2014, 37 pages.

*Primary Examiner* — Thai Ba Trieu
(74) *Attorney, Agent, or Firm* — Julia Voutyras; Alleman Hall McCoy Russell & Tuttle LLP (57) ABSTRACT

A supercharged internal combustion engine comprising a two channel turbine fluidly connects the two channels within the turbine housing by virtue of at least one opening in the housing wall which separates the two channels wherein at least one displaceable wall part is provided which serves for opening up the opening in the housing wall to optimize the performance of the turbine responsive to the exhaust gas flow rate.

16 Claims, 7 Drawing Sheets (51) Int. Cl.
*F04D 29/54* (2006.01)
*F02B 37/00* (2006.01)
*F02B 37/02* (2006.01)
*F02B 37/18* (2006.01)
*F02B 37/22* (2006.01)
*F01D 17/18* (2006.01)
*F02C 6/12* (2006.01)
*F01D 9/02* (2006.01)

(52) U.S. Cl.
CPC ......... *F05D 2220/40* (2013.01); *F05D 2250/51* (2013.01); *Y02T 10/144* (2013.01)

(56) References Cited

U.S. PATENT DOCUMENTS

| | | | |
|---|---|---|---|
| 3,383,092 A * | 5/1968 | Cazier | 415/205 |
| 3,423,926 A | 1/1969 | Nancarrow et al. | |
| 3,614,259 A * | 10/1971 | Neff | 415/205 |
| 4,008,572 A * | 2/1977 | Woollenweber, Jr. | 60/602 |
| 4,177,005 A * | 12/1979 | Bozung et al. | 415/205 |
| 4,179,892 A * | 12/1979 | Heydrich | 60/605.2 |
| 4,526,004 A * | 7/1985 | French et al. | 60/602 |
| 4,530,640 A * | 7/1985 | MacInnes | 415/144 |
| 5,943,864 A * | 8/1999 | Sumser et al. | 60/602 |
| 6,073,447 A * | 6/2000 | Kawakami et al. | 60/602 |
| 6,250,079 B1 * | 6/2001 | Zander et al. | 60/602 |
| 6,269,643 B1 * | 8/2001 | Schmidt et al. | 60/602 |
| 6,324,847 B1 * | 12/2001 | Pierpont | 60/602 |
| 7,481,056 B2 * | 1/2009 | Blaylock et al. | 60/602 |
| 7,637,106 B2 * | 12/2009 | Hertweck et al. | 60/602 |
| 7,644,585 B2 | 1/2010 | Haugen | |
| 7,934,379 B2 | 5/2011 | Küspert et al. | |
| 8,176,737 B2 * | 5/2012 | Pierpont et al. | 60/605.2 |
| 8,196,403 B2 * | 6/2012 | Hittle et al. | 60/602 |
| 8,201,405 B2 * | 6/2012 | Bruce et al. | 60/602 |
| 8,951,005 B2 * | 2/2015 | Smeulers | F04D 29/422 415/204 |
| 2003/0000211 A1 * | 1/2003 | Drangel et al. | 60/602 |
| 2010/0266390 A1 | 10/2010 | Henderson et al. | |
| 2011/0052374 A1 | 3/2011 | Arnold | |

FOREIGN PATENT DOCUMENTS

| | | | |
|---|---|---|---|
| DE | 102006058102 A1 | 6/2008 | |
| EP | 1020618 A2 * | 7/2000 | F01D 1/023 |
| GB | 2416003 A * | 1/2006 | F04D 29/426 |
| JP | 57137619 A * | 8/1982 | F02B 37/12 |
| WO | 2008028666 A1 | 3/2008 | |
| WO | 2011101005 A1 | 8/2011 | |

* cited by examiner

SUPERCHARGED INTERNAL COMBUSTION ENGINE WITH TWO-CHANNEL TURBINE AND METHOD

CROSS REFERENCE TO RELATED APPLICATIONS

The present application claims priority to German Patent Application No. 102013202744.3, filed on Feb. 20, 2013, the entire contents of which are hereby incorporated by reference for all purposes.

BACKGROUND\SUMMARY

A supercharged internal combustion engine may comprise at least two cylinders, where each cylinder has an outlet for discharging exhaust gases. The exhaust lines of the cylinders may be configured to form an exhaust manifold. The exhaust manifold may be connected to an inlet of a turbocharger to increase power density over a wider engine operating range.

One approach is to merge the exhaust lines of the cylinders to form a first group and second group such that the dynamic wave phenomena in the exhaust lines of the cylinders of a group have the least possible adverse effect on one another. Another approach is to merge the exhaust lines of the cylinders into a single overall exhaust line upstream of the turbine. Further, concepts may be known in which the two exhaust manifolds can be connected to and separated from one another.

A potential issue noted by the inventors with the above approaches is that when exhaust lines of cylinders may be merged into a first and second group the charge exchange may interfere detrimentally. This approach may not allow the turbine to be operated optimally at high loads. Another potential issue noted by the inventors is a single overall exhaust line provides a large volume of exhaust gas upstream of the turbine and may impair turbine operation at low exhaust gas flow rates. Further, connecting exhaust manifolds may lead to a residual gas problem and knocking being abetted.

One potential approach to at least partially address some of the above issues relates to a supercharged internal combustion engine having at least one cylinder head with at least two cylinders in which a cylinder has at least one outlet opening for discharging the exhaust gases. Further, an outlet opening may be adjoined by an exhaust line and the at least two cylinders may be configured in such a way as to form two groups with at least one cylinder wherein the exhaust lines of the cylinders of the cylinder group merge to form an overall exhaust line such that an exhaust manifold is formed. The two overall exhaust lines may be connected to a two channel turbine which comprises a rotor which is mounted on a rotatable shaft in a turbine housing such that one overall exhaust line is connected to one of the two inlet openings of the turbine. Wherein an inlet opening is adjoined by one channel of the turbine and the two channels may be separated from one another as far as the rotor by means of a housing wall such that the exhaust-streams of the two channels may be conducted separate from one another to the rotor. Further, the two channels of the turbine can be connected to one another within the turbine housing by virtue of at least one opening in the housing wall upstream of the rotor and downstream of the inlet openings being opening up. This may allow for optimal operation of the turbine at high exhaust gas flow rates and low exhaust gas flow rates.

Another potential approach is a method for an engine comprising adjusting a displaceable wall part which serves to open or close an opening in the housing wall of a turbine housing upstream of a rotor and downstream of inlet openings to fluidly connect two channels of the turbine housing via the opening responsive to exhaust gas flow rate over a threshold. In this way, it is possible to adjust the communication between multiple passages in the turbocharger housing depending on the operating conditions of the engine to improve overall performance.

It should be understood that the summary above is provided to introduce in simplified form a selection of concepts that may be further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF FIGURES

FIG. 2b schematically shows the turbine illustrated in FIG. 2a in a section rotated through 90° with respect to FIG. 2a.

DETAILED DISCUSSION

A supercharged internal combustion engine having at least one cylinder head with at least two cylinders, in which a cylinder has at least one outlet opening for discharging the exhaust gases out of the cylinder, and the outlet opening is adjoined by an exhaust line. The at least two cylinders may be configured in such a way as to form two groups with at least one cylinder and the exhaust lines of the cylinders of the cylinder group merge to form an overall exhaust line such that an exhaust manifold is formed. Further the two overall exhaust lines may be connected to a two-channel turbine, which comprises a rotor which is mounted on a rotatable shaft in a turbine housing, such that one overall exhaust line is connected to one of the two inlet openings of the turbine, wherein an inlet opening is adjoined by one channel of the turbine and the two channels may be separated from one another as far as the rotor by means of a housing wall, such that the exhaust-gas streams of the two channels may be conducted separate from one another to the rotor.

Further a method for operating an internal combustion engine of said type is provided.

The expression "internal combustion engine" encompasses in particular Otto-cycle engines but also diesel engines and hybrid internal combustion engines, that is to say internal combustion engines which may be operated using a hybrid combustion process.

Internal combustion engines have a cylinder block and a cylinder head which may be connected to one another to form the cylinders. The cylinder head conventionally serves to hold the valve drive. To control the charge exchange, an internal combustion engine requires control elements—generally in the form of valves—and actuating devices for actuating these control elements. The valve actuating mechanism considered for the movement of the valves, including the valves themselves, is referred to as the valve drive. During the charge exchange, the combustion gases may be discharged via the outlet openings of the at least two cylinders, and the charging of the combustion chambers, that is to say the induction of fresh mixture or charge air, takes place via the inlet openings.

According to the prior art, the exhaust lines which adjoin the outlet openings may be at least partially integrated in the cylinder head and may be merged to form a common overall exhaust line or in groups to form two or more overall exhaust lines. The merging of exhaust lines to form an overall exhaust line is referred to generally as an exhaust manifold.

The way in which the exhaust lines of the cylinders may be merged in the specific situation, that is to say the specific configuration of the exhaust-gas discharge system, is dependent substantially on that operating range of the internal combustion engine which is given priority, that is to say the operating ranges for which the operating behavior of the internal combustion engine is to be optimized.

In the case of supercharged internal combustion engines in which at least one turbine of an exhaust-gas turbocharger is provided in the exhaust-gas discharge system and which may be intended to exhibit satisfactory operating behavior in the lower engine speed and/or load range, that is to say in the case of relatively low exhaust-gas flow rates, so-called impulse supercharging is selected.

Here, the dynamic wave phenomena which occur in the exhaust-gas discharge system—in particular during the charge exchange—should be utilized for the purpose of supercharging and for improving the operating behavior of the internal combustion engine.

The evacuation of the combustion gases out of a cylinder of the internal combustion engine during the charge exchange is based substantially on two different mechanisms. When the outlet valve opens close to bottom dead center at the start of the charge exchange, the combustion gases flow at high speed through the outlet opening into the exhaust-gas discharge system on account of the high pressure level prevailing in the cylinder at the end of the combustion and the associated high pressure difference between the combustion chamber and exhaust line. Said pressure-driven flow process is assisted by a high pressure peak which is also referred to as a pre-outlet shock and which propagates along the exhaust line at the speed of sound, with the pressure being dissipated, that is to say reduced, to a greater or lesser extent with increasing distance traveled as a result of friction.

During the further course of the charge exchange, the pressures in the cylinder and in the exhaust line may be equalized, such that the combustion gases may be no longer evacuated primarily in a pressure-driven manner but rather may be discharged as a result of the reciprocating movement of the piston.

At low loads or engine speeds, that is to say low exhaust-gas flow rates, the pre-outlet shock may advantageously be utilized for impulse supercharging, as a result of which it is possible to obtain high turbine pressure ratios even at low turbine rotational speeds. In this way, it is possible by means of exhaust-gas turbocharging to generate high charge-pressure ratios, that is to say high charge pressures on the inlet side, even in the case of only low exhaust-gas flow rates, that is to say at low loads and/or low engine speeds.

Impulse supercharging has proven to be particularly advantageous for accelerating the turbine rotor, that is to say for increasing the turbine rotational speed, which can fall to a noticeable extent during idle operation of the internal combustion engine or at low load, and which should frequently be increased again with as little delay as possible by means of the exhaust-gas flow in the event of an increased load demand. The inertia of the rotor and the friction in the shaft bearing arrangement generally slow an acceleration of the rotor to higher rotational speeds and therefore hinder an immediate rise in the charge pressure.

To be able to utilize the dynamic wave phenomena occurring in the exhaust-gas discharge system, in particular the pre-outlet shocks, for the impulse supercharging for improving the operating behavior of the internal combustion engine, the pressure peaks or pre-outlet shocks in the exhaust-gas discharge system must be maintained. It is particularly advantageous if the pressure fluctuations may be intensified in the exhaust lines, but at least do not attenuate one another or cancel one another out.

It is therefore expedient for the cylinders to be grouped, or for the exhaust lines to be merged, in such a manner that the high pressures, in particular the pre-outlet shocks of the individual cylinders, in the exhaust-gas discharge system may be maintained.

The subject matter also encompasses an internal combustion engine in which the cylinders may be grouped. At least two cylinders may be configured in such a way as to form two groups with at least one cylinder per group. The exhaust lines of the cylinders of the cylinder group merge into an overall exhaust line such that an exhaust manifold is formed. Here, the cylinders may be configured in such a way that the dynamic wave phenomena in the exhaust lines of the cylinders of a group have the least possible adverse effect on one another.

Figure 7:
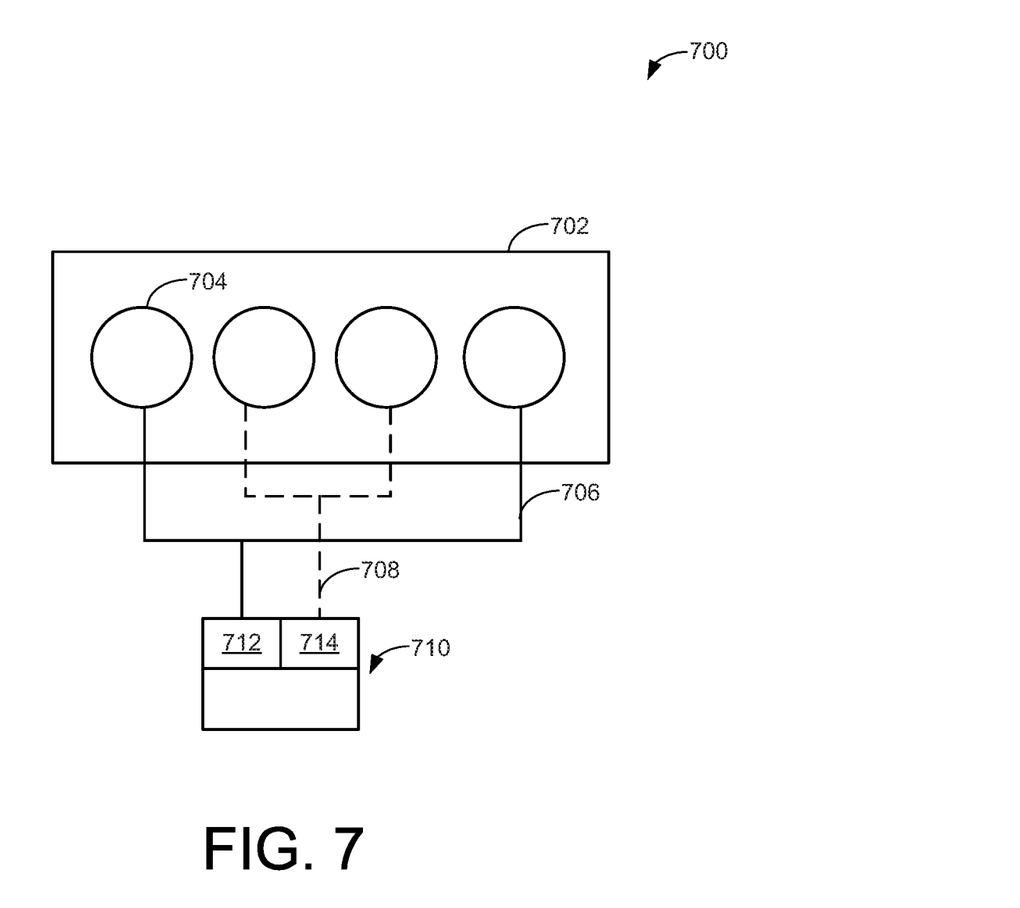
FIG. 7 schematically shows two engine exhaust manifolds leading to inlets of a two-channel turbine.

In a cylinder head having four cylinders in an in-line arrangement (e.g., cylinder head 702 having four cylinders 704 shown in FIG. 7), it is advantageous in this regard for two cylinders which have an ignition interval of 360° CA to be combined to form a cylinder group. For example, if the ignition in the cylinders is initiated in accordance with the ignition sequence 1-2-4-3 or in accordance with the ignition sequence 1-3-4-2, it is advantageous for the outer cylinders to be combined to form a first group and for the inner cylinders to be combined to form a second group.

Impulse supercharging however also has disadvantages. For example, the charge exchange is generally impaired as a result of the pressure fluctuations in the exhaust-gas discharge system. The cylinders of a group may have an interfering, that is to say detrimental effect on one another during the charge exchange. The pressure waves originating from a cylinder run not only through the at least one exhaust line of said cylinder but also along the exhaust lines of the other cylinders of said group, specifically possibly as far as the outlet opening provided at the end of the respective line. Exhaust gas which has already been expelled or discharged into an exhaust line during the charge exchange can thus pass back into the cylinder again, specifically as a result of the pressure wave originating from another cylinder. In particular, it has proven to be disadvantageous if, toward the end of the charge exchange, positive pressure prevails at the outlet opening of a cylinder or the pressure wave of another cylinder propagates along the exhaust line in the direction of the outlet opening, as this counteracts the evacuation of the combustion gases out of said cylinder. In said phase of the charge exchange, the combustion gases may be discharged primarily owing to the reciprocating movement of the piston. In individual situations, it may even be the case that exhaust gas originating from one cylinder passes into another cylinder before the outlet thereof closes. The impaired charge exchange leads to disadvantages, in particular under increasing load and with increasing engine speed. The exhaust gas situated in the cylinder, that is to say the residual gas fraction remaining in the cylinder, has a significant influence on the knocking behavior of the internal combustion engine, wherein the risk of knocking combustion rises with increasing exhaust-gas fraction.

It must also be taken into consideration that a turbine is operated most effectively under steady-state engine operating conditions. To enable a turbine which is provided downstream of the cylinders in the exhaust-gas discharge system to be operated optimally at high loads and high rotational speeds, that is to say at high exhaust-gas flow rates, the turbine should be acted on with as constant an exhaust-gas flow as possible, for which reason a pressure which varies as little as possible is preferable upstream of the turbine under said operating conditions in order to realize so-called ram supercharging.

As a result of a correspondingly large exhaust-gas volume upstream of the turbine, the pressure pulsations in the exhaust lines can be smoothed. In this respect, the grouping of the cylinders, whereby the exhaust lines may be combined in groups, resulting in the volume of the exhaust-gas discharge system upstream of the turbine being divided into a plurality of partial volumes, has proven to be counterproductive.

With regard to ram supercharging, it may rather be advantageous for the exhaust lines of all the cylinders to be merged into a single overall exhaust line in order to make the exhaust-gas volume of the exhaust-gas discharge system upstream of a turbine which is arranged in said overall exhaust line as large as possible, that is to say to maximize said exhaust-gas volume, and to minimize the pressure fluctuations.

There is thus a resulting conflict of aims when configuring the exhaust-gas discharge system for the purpose of optimizing the exhaust-gas discharge system both with regard to low exhaust-gas flow rates and also with regard to relatively high exhaust-gas flow rates. Grouping the cylinders in order to realize impulse supercharging leads to an expedient operating behavior at low exhaust-gas flow rates, but disadvantages must be accepted at relatively high exhaust-gas flow rates. In contrast, if as large an exhaust-gas volume as possible is realized upstream of the turbine in order to be able to utilize the advantages of ram supercharging at relatively high exhaust-gas flow rates, the operating behavior at relatively low exhaust-gas flow rates is impaired.

Concepts are known from the prior art in which the two exhaust manifolds of the two cylinder groups can be connected to and separated from one another. The exhaust-gas discharge system is then configured as a function of the magnitude of the exhaust-gas flow, that is to say, in the case of low exhaust-gas flow rates, by separating the manifolds in accordance with impulse supercharging, and in the case of relatively high exhaust-gas flow rates, by connecting the manifolds in accordance with ram supercharging.

A disadvantage of the concept described above is that, as a result of the connection of the manifolds, a connection is realized close to the outlet openings of the cylinders, whereby the residual gas problem described above, and the associated knocking problem, is abetted, that is to say intensified.

Against the background of that stated above, it is an object to provide a supercharged internal combustion engine which permits optimized operation both in the case of low exhaust-gas flow rates and in the case of relatively high exhaust-gas flow rates.

It is a further sub-object to specify a method for operating an internal combustion engine of said type.

The first sub-object is achieved by means of a supercharged internal combustion engine having at least one cylinder head with at least two cylinders, in which the cylinder has at least one outlet opening for discharging the exhaust gases out of the cylinder, and each outlet opening is adjoined by an exhaust line, at least two cylinders may be configured in such a way as to form two groups with at least one cylinder. For example, as shown in schematic 700 of FIG. 7, the exhaust lines of the cylinders of each cylinder group merge to form an overall exhaust line such that an exhaust manifold is formed, and the two overall exhaust lines 706, 708 may be connected to a two-channel turbine 710, which comprises a rotor which is mounted on a rotatable shaft in a turbine housing, such that overall exhaust line is connected to one of the two inlet openings 712, 714 of the turbine, wherein an inlet opening is adjoined by one channel of the turbine and the two channels may be separated from one another as far as the rotor by means of a housing wall, such that the exhaust-gas streams of the two channels may be conducted separate from one another to the rotor, and wherein the two channels of the turbine can be connected to one another within the turbine housing by virtue of at least one opening in the housing wall upstream of the rotor and downstream of the inlet openings being opened up.

In the internal combustion engine, the volume of the exhaust system communicating with an individual channel of the turbine can be varied, specifically by virtue of the two channels of the turbine being connected or separated.

Consequently, it is also possible for the exhaust-gas volume or the exhaust-gas discharge system upstream of the rotor of the two-channel turbine to be adapted to different operating conditions of the internal combustion engine, in particular to different exhaust-gas flow rates, and optimized in this regard.

In relation to the connection of the two exhaust manifolds, the connection of the two channels of the turbine has the advantage that the opening that connects the exhaust systems of the two cylinder groups is arranged further remote from the outlet openings of the cylinders, whereby the exhaust line distance between a cylinder of one group and a cylinder of the other group is increased. The risk of mutual, in particular adverse influencing during the charge exchange is thereby counteracted. The above-described residual gas problem or knocking problem is alleviated or eliminated.

The relationships and effects described above may be highly relevant in particular in the case of supercharged internal combustion engines in which the exhaust lines of the cylinders of the cylinder group merge to form an overall exhaust line, such that an exhaust manifold is formed, within the cylinder head, because a connection of the manifolds may result in the realization of a connection situated extremely close to the outlet openings of the cylinders.

The first object, specifically that of providing a supercharged internal combustion engine which permits optimized operation both in the case of low exhaust-gas flow rates and in the case of relatively high exhaust-gas flow rates, is thereby achieved.

The conflict of aims which is known from the prior art and which results from the different demands placed on the exhaust-gas volume situated upstream of the rotor by the ram supercharging and impulse supercharging, specifically on the one hand the provision of a small volume in order to realize impulse supercharging in the case of low exhaust-gas flow rates, and on the other hand the provision of as large a volume as possible, in order to deplete the pressure peaks and smooth the exhaust-gas pressure, for the purposes of ram supercharging in the case of relatively high exhaust-gas flow rates, is resolved.

In the case of relatively low exhaust-gas flow rates, the two channels of the turbine and thus the exhaust systems of the cylinder groups remain separate from one another, such that a channel communicates only with the exhaust lines of that cylinder group from which it is originally fed. The exhaust-gas volume upstream of a channel is determined by the volume of the exhaust lines of the associated manifold and the volume of the overall exhaust line that connects the manifold to the inlet opening of the corresponding turbine channel.

The relatively small volumes upstream of the rotor permit impulse supercharging. By utilizing the pressure peaks which propagate in the exhaust manifolds, it is then possible to obtain high turbine pressure ratios even at only low exhaust-gas flow rates. If the turbine is used within the context of exhaust-gas turbocharging, it is possible in this way to generate high charge pressure ratios, that is to say high charge pressures, at only low exhaust-gas flow rates.

The pressure fluctuations in the exhaust-gas discharge system that may be considered to be disadvantageous within the context of ram supercharging at relatively high exhaust-gas flow rates can be smoothed, and at best even eliminated, by connecting the two channels of the turbine. Here, the volumes of the exhaust-gas discharge system upstream of the rotor may be combined. The individual channel then no longer communicates only with the exhaust-gas volume of the cylinder group associated therewith but likewise communicates with the exhaust-gas volume of the other cylinder group. In this way, an additional volume is provided for the channel, whereby the exhaust-gas volume upstream of the channel is enlarged, or one large volume is provided upstream of the rotor instead of two small volumes. Said volume enlargement better enables an exhaust-gas pressure which varies little, and is substantially constant, upstream of the rotor, and therefore expedient conditions for ram supercharging at relatively high exhaust-gas flow rates.

The inlet region of a two-channel turbine has two inlet ducts. Multi-channel turbines may be therefore particularly suitable for supercharged internal combustion engines in which the exhaust lines of the cylinders may be merged in groups in order to realize impulse supercharging. The two channels, which can be connected to one another, of the two-channel turbine permit a switch between impulse supercharging and ram supercharging. The turbine may fundamentally be fitted with a variable turbine geometry which can be adapted by adjustment to the respective operating point of the internal combustion engine.

In the internal combustion engine, the exhaust lines of at least two cylinders may be merged to form two overall exhaust lines such that two exhaust manifolds may be formed.

In this respect, embodiments having three, four, five or more cylinders, wherein the exhaust lines of more than two cylinders may be merged to form two overall exhaust lines, may be likewise internal combustion engines.

Further advantageous embodiments of the internal combustion engine will be explained in conjunction with the subclaims.

Embodiments of the supercharged internal combustion engine may be advantageous in which the two-channel turbine is a dual-flow turbine in which the two channels may be arranged one on top of the other and, at least along an arc-shaped segment, enclose the rotor in spiral form at different radii.

Here, embodiments of the supercharged internal combustion engine may be advantageous in which the two inlet openings of the dual-flow turbine may be arranged in the housing at different radial distances from the shaft of the turbine.

A dual-flow turbine exhibits greater efficiency, and improved flow impingement on the rotor, in relation to the twin-flow turbine. Furthermore, the dual-flow turbine can be subjected to greater thermal loading. The latter advantage results from the arrangement of the channels one above the other, and will be explained in more detail during the course of the description of the figures.

Embodiments of the supercharged internal combustion engine may however also be advantageous in which the two-channel turbine is a twin-flow turbine in which the two channels may be arranged adjacent to one another and, at least along an arc-shaped segment, enclose the rotor in spiral form at equal radii.

In the case of supercharged internal combustion engines in which the two-channel turbine is a twin-flow turbine, embodiments may be advantageous wherein the two inlet openings of the twin-flow turbine may be arranged in the housing at the same radial distance from the shaft of the turbine.

Embodiments of the supercharged internal combustion engine may be advantageous in which the housing wall is an immovable wall that is fixedly connected to the housing. Said embodiment of the housing wall better enables that the heat introduced into the housing wall by the hot exhaust gas is discharged into and via the housing in an advantageous manner and to an adequate extent.

Embodiments of the supercharged internal combustion engine may be advantageous in which at least one displaceable wall part is provided which serves for opening up the at least one opening in the housing wall. The use of a wall part makes it possible for a relatively large opening to be opened up in a simple manner simply by displacement of said wall part.

In this context, embodiments of the supercharged internal combustion engine may be advantageous in which the at least one displaceable wall part is displaceable along the axis of rotation of the rotor.

Embodiments of the supercharged internal combustion engine may however also be advantageous in which the at least one displaceable wall part is displaceable along the flow direction of the exhaust gas.

In the case of supercharged internal combustion engines in which at least one displaceable wall part is provided for opening up the at least one opening, embodiments may be advantageous wherein the at least one opening has a comb-shaped form and the at least one displaceable wall part has a form corresponding thereto.

The interaction of the comb-shaped opening with the comb-shaped wall part corresponding thereto better enables that the housing wall is stable both when the opening is closed and also when the opening is opened up.

Embodiments of the supercharged internal combustion engine may also be advantageous in which at least one shut-off element is provided in the housing wall, which shut-off element serves for opening up the at least one opening in the housing wall. It is also possible for a plurality of openings and shut-off elements to be provided.

The flow cross section of the opening can be varied by means of a shut-off element. In particular, the opening for the exhaust gas is opened up and closed, that is to say the two channels may be connected to one another and separated from one another. Embodiments may be advantageous in which the shut-off element is a valve, a slide, a flap or the like.

Embodiments may be advantageous in which the shut-off element can be electrically, hydraulically, pneumatically, mechanically or magnetically controlled, preferably by means of the engine controller of the internal combustion engine.

The shut-off element can preferably be switched in two-stage fashion in such a way as to either close or open up the at least one opening, which simplifies control and in particular offers cost advantages. The shut-off element may however also be switchable in continuously variable fashion in order to reduce an abrupt torque drop or torque increase during the actuation of the shut-off element, that is to say upon the transition from impulse supercharging to ram supercharging and vice versa.

Embodiments of the supercharged internal combustion engine may be advantageous in which the exhaust lines of the cylinders of the cylinder group merge to form an overall exhaust line, such that two exhaust manifolds may be formed, within the cylinder head.

The two-channel turbine provided in the exhaust-gas discharge system may then be arranged very close to the outlet of the internal combustion engine, that is to say close to the outlet openings of the cylinders. This has several advantages, in particular because the exhaust lines between the cylinders and the turbine may be shortened.

Since the path to the turbine for the hot exhaust gases is shortened, the volume of the exhaust manifold or of the exhaust-gas discharge system upstream of the turbine also decreases. The thermal inertia of the exhaust-gas discharge system is likewise reduced as a result of the reduction of the mass and the length of the exhaust lines in question.

In this way, the exhaust-gas enthalpy of the hot exhaust gases, which is determined significantly by the exhaust-gas pressure and the exhaust-gas temperature, may be utilized optimally, and a fast response behavior of the turbine better enabled.

The proposed measure also results in a compact design of the cylinder head and thus of the internal combustion engine, and permits dense packaging of the drive unit as a whole.

The shortening of the line lengths and the associated reduction in size of the exhaust-gas volume upstream of the turbine assists the impulse supercharging in the low load and engine speed range.

The second sub-object, specifically that of specifying a method for operating a supercharged internal combustion engine of a type described above, is achieved by means of a method in which the two channels of the turbine may be connected to one another if the exhaust-gas flow rate from the two cylinder groups falls below a first predefinable exhaust-gas flow rate.

That which has been stated in connection with the internal combustion engine likewise applies to the method.

In a non-supercharged internal combustion engine, the exhaust-gas flow rate corresponds approximately to the engine speed and/or load of the internal combustion engine, specifically as a function of the load control used in the individual situation. In a traditional Otto-cycle engine with quantity regulation, the exhaust-gas flow rate increases with increasing load even at a constant engine speed, whereas in traditional diesel engines with quality regulation, the exhaust-gas flow rate is dependent merely on engine speed, because in the event of a load shift at constant engine speed, the mixture composition but not the mixture quantity is varied.

If an internal combustion engine with quantity regulation is used in which the load is controlled by means of the flow rate of fresh mixture, the approach in the operation of said internal combustion engine means that the channels of the turbine may be connected to one another if—assuming a fixed engine speed—the load of the internal combustion engine exceeds a first predefinable load, since the exhaust-gas flow rate in an internal combustion engine of said type corresponds to the load, and the exhaust-gas flow rate rises with increasing load and falls with decreasing load. Furthermore, the two channels of the turbine may be connected to one another if the engine speed of the Otto-cycle engine exceeds a predefinable engine speed, because the exhaust-gas flow rate rises with increasing engine speed and falls with decreasing engine speed, independently of the load control used in the individual situation.

If, in contrast, the internal combustion engine is based on quality regulation, in which the load is controlled by means of the composition of the fresh mixture and the exhaust-gas flow rate varies virtually exclusively with engine speed, that is to say is proportional to the engine speed, then in the method for operating said internal combustion engine, the two channels of the turbine may be connected to one another, in a manner independent of load, if the engine speed of the internal combustion engine exceeds a first predefinable engine speed, since in the present case, the exhaust-gas flow rate rises with increasing engine speed and falls with decreasing engine speed.

If the internal combustion engine is one which is supercharged—in particular by means of exhaust-gas turbocharging—it must additionally be taken into consideration that the charge pressure on the inlet side may vary with the load and/or engine speed, and has an influence on the exhaust-gas flow rate. The relationships presented in simplified form above between the exhaust-gas flow rate and the load or engine speed then consequently do not apply in said general form. The method is therefore geared very generally to the exhaust-gas quantity and not to the load or rotational speed. The two channels of the turbine may be therefore connected to one another if the exhaust-gas flow rate from the two cylinder groups exceeds a first predefinable exhaust-gas flow rate.

Method variants may be advantageous in which the two channels of the turbine may be connected to one another if the exhaust-gas flow rate from the two cylinder groups exceeds the first predefinable exhaust-gas flow rate and is greater than said first predefinable exhaust-gas flow rate for a predefinable time period $\Delta t_1$.

The introduction of an additional condition for the connection of the two channels is intended to reduce an excessively frequent mode change between impulse supercharging and ram supercharging, in particular a transition to ram supercharging if the exhaust-gas flow rate only briefly exceeds the first predefinable exhaust-gas flow rate and then falls again or fluctuates around the first predefinable value for the exhaust-gas flow rate, without the exceedance justifying a transition to ram supercharging.

If a displaceable wall part is used for opening up the at least one opening, method variants may be advantageous in which the two channels of the turbine may be connected to one another by displacement of said at least one wall part.

Method variants may be advantageous in which, proceeding from a state in which the channels may be connected to one another, the two channels of the turbine may be separated from one another if the exhaust-gas flow rate from the two cylinder groups falls below a second predefinable exhaust-gas flow rate.

For reasons already stated above, method variants may be advantageous in which the two channels of the turbine may be separated from one another if the exhaust-gas flow rate from the two cylinder groups falls below the second predefinable exhaust-gas flow rate and may be lower than said second predefinable exhaust-gas flow rate for a predefinable time period $\Delta t_2$.

Figure 1A:
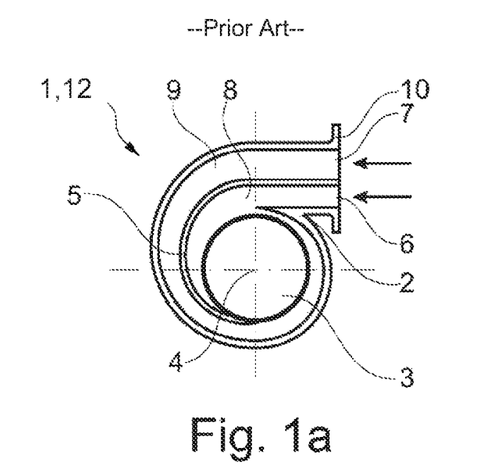
FIG. 1a schematically shows the basic design of a dual-flow turbine, sectioned perpendicularly to the axis of rotation of the rotor.

FIG. 1a schematically shows the basic design of a dual-flow turbine 12, sectioned perpendicularly to the axis of rotation 4 of the rotor 3.

The illustrated dual-flow turbine 12 is an example of a two-channel turbine 1, that is to say of a turbine 1 with two channels 8, 9. The turbine 1 has a turbine housing 2 in which a rotor 3 is mounted on a rotatable shaft 4.

The dual-flow turbine 12 is characterized by the fact that the two channels 8, 9 may be arranged one on top of the other and, at least along an arc-shaped segment, surround the rotor 3 in spiral form at different radii. The two inlet openings 6, 7 of the dual-flow turbine 12 may be arranged in a flange 10 of the housing 5 at different radial distances from the shaft 4 of the turbine 1, wherein an inlet opening 6, 7 is adjoined by a channel 8, 9 of the turbine 1 and the two channels 8, 9 may be separated from one another as far as the rotor 3 by means of a housing wall 5. In this way, the exhaust-gas streams of the two channels 8, 9 may be conducted separate from one another to the rotor 3.

Figure 1B:
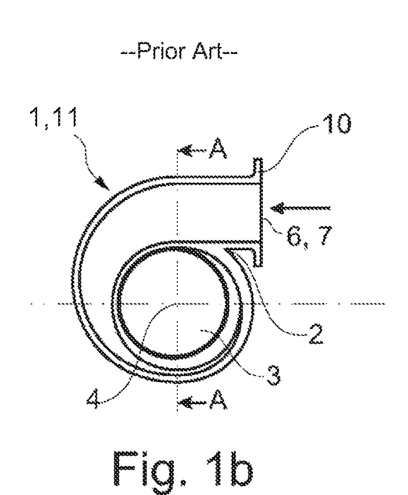
FIG. 1b schematically shows the basic design of a twin-flow turbine, sectioned perpendicularly to the axis of rotation of the rotor.
Figure 1C:
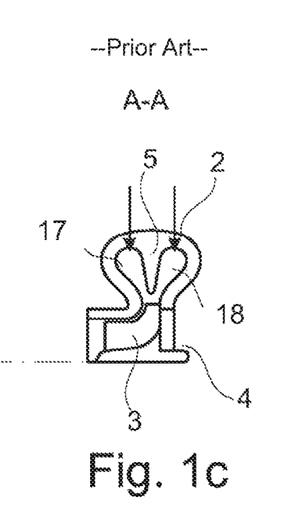
FIG. 1c schematically shows the twin-flow turbine illustrated in FIG. 1b, along the section A-A indicated in FIG. 1b.

FIGS. 1b and 1c schematically show the basic design of a twin-flow turbine 11, wherein FIG. 1b is a section perpendicular to the axis of rotation 4 of the rotor 3 and FIG. 1c shows the twin-flow turbine 11 along the section A-A indicated in f FIG. 1b.

It is sought to explain only the differences in relation to the dual-flow turbine illustrated in FIG. 1a, for which reason reference is otherwise made to FIG. 1a and the associated description. The same reference symbols have been used for the same components.

The twin-flow turbine 11 is characterized by the fact that the two channels 13, 14 may be arranged adjacent to one another and, at least along an arc-shaped segment, surround the rotor 3 in spiral form at equal radii. The two inlet openings 6, 7 of the twin-flow turbine 11 may be arranged in the housing 2 so as to be spaced apart from the shaft 4 of the turbine 1 by the same radial distance.

The housing wall 5 of the twin-flow turbine 11 is subjected to significantly greater thermal loading at its free end than that of the dual-flow turbine 12, in particular in the transition region to the rotor 3, as can be seen from FIG. 1c.

FIGS. 2a, 2b, 2c and 2d schematically show the two-channel turbine 1 of a first embodiment of the supercharged internal combustion engine. It is sought merely to explain the additional features in relation to FIG. 1a, for which reason reference is made otherwise to FIG. 1a and the associated figure description. The same reference symbols have been used for the same components.

The dual-flow turbine 12 which is shown is characterized in that the two channels 8, 9 can be connected to one another within the turbine housing 2 by virtue of multiple openings 5a in the housing wall 5 being opened up. The openings 5a may be arranged in the housing wall 5 upstream of the rotor 3 and downstream of the inlet openings 6, 7.

A displaceable wall part 5b serves for opening up and closing the openings 5a, which displaceable wall part is displaceable along the axis of rotation 4 of the rotor 3, that is to say along a line parallel to the axis of rotation 4 of the rotor 3. Further the opening 5a may have a comb-shaped form and the displaceable wall part 5b may have a form corresponding thereto.

Figure 2A:
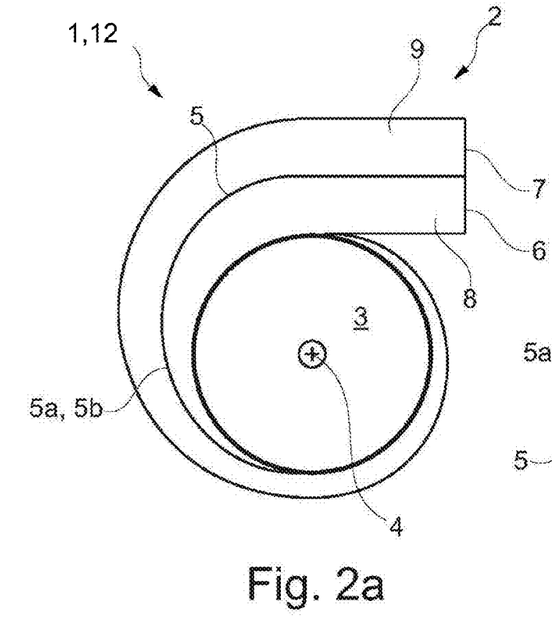
FIG. 2a schematically shows the two-channel turbine of a first embodiment of the supercharged internal combustion engine, sectioned perpendicularly to the axis of rotation of the rotor, and with the channels separated.
Figure 2B:
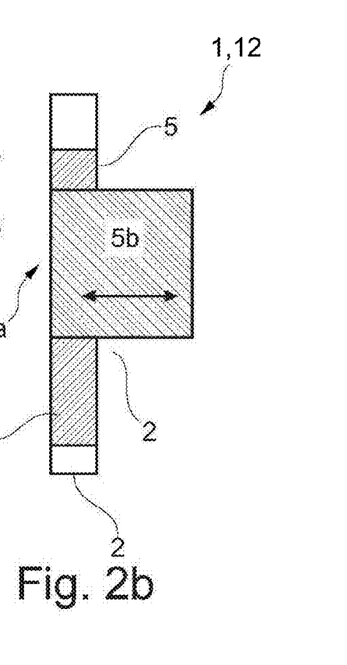
Figure 2C:
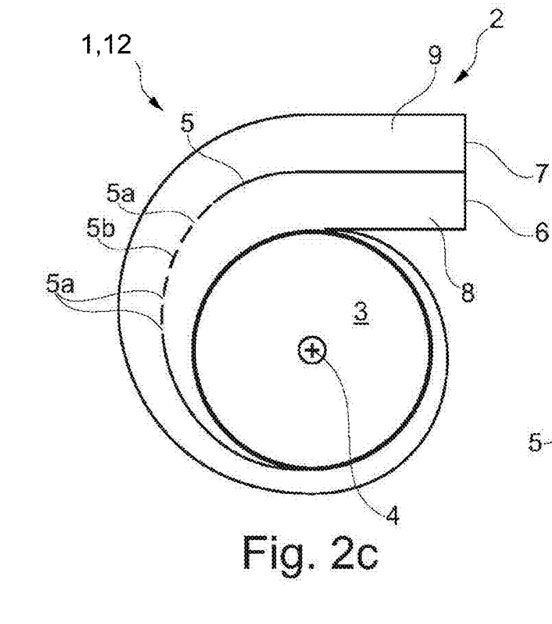
FIG. 2c schematically shows the turbine illustrated in FIG. 2a, sectioned perpendicularly with respect to the axis of rotation of the rotor, and with the channels connected.
Figure 2D:
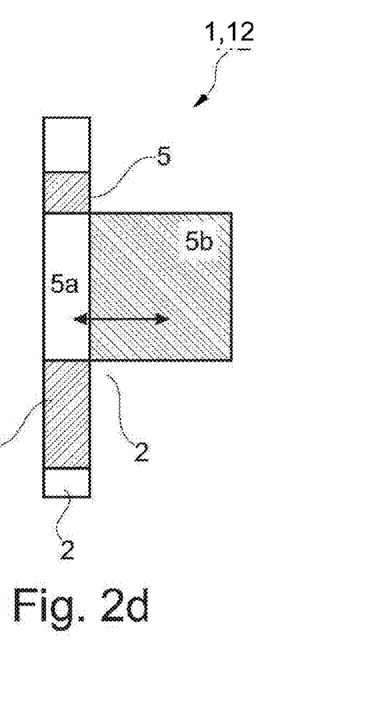
FIG. 2d schematically shows the turbine illustrated in FIG. 2c in a section rotated through 90° with respect to FIG. 2c.

FIGS. 2a and 2b show the dual-flow turbine 12 with the channels 8, 9 separated, that is to say with the openings 5a closed, whereas FIGS. 2c and 2d show the dual-flow turbine 12, the turbine 1, with the channels connected, that is to say with the openings 5a opened up.

Figure 3A:
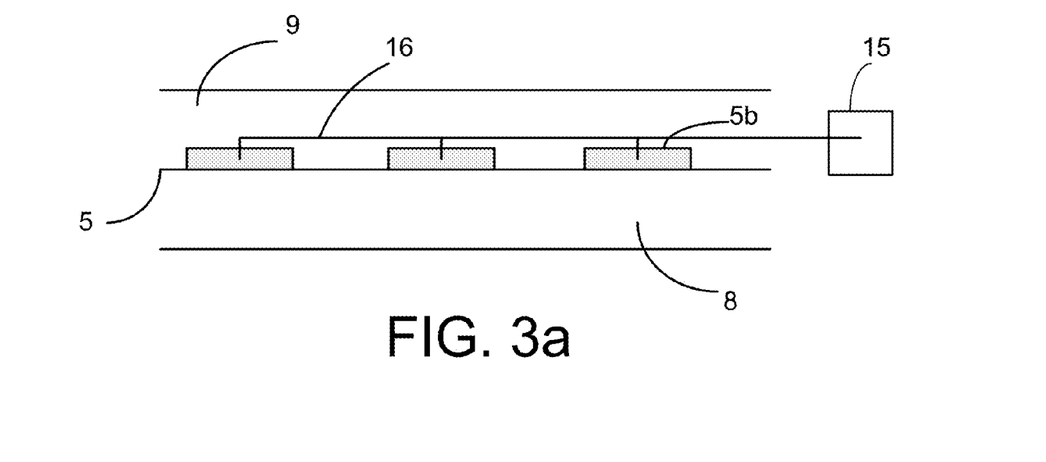
FIG. 3a schematically shows a displaceable wall part movable in the direction of the exhaust flow in a closed position.
Figure 3B:
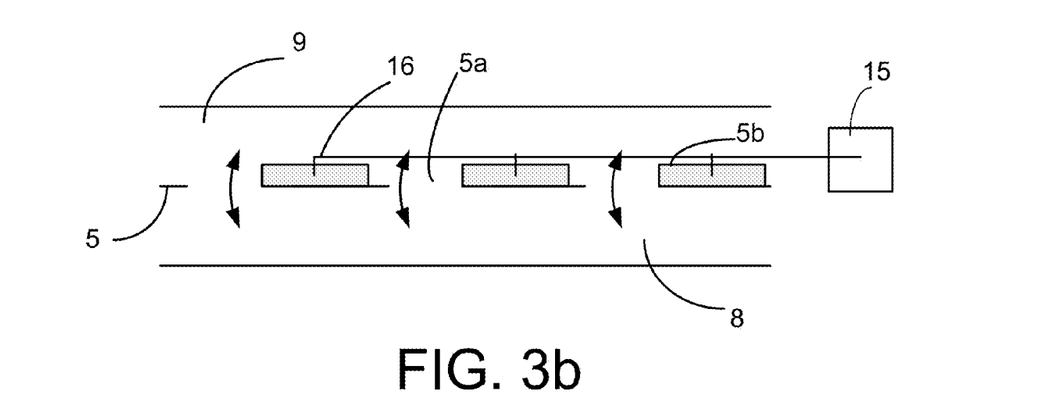
FIG. 3b schematically shows a displaceable wall part movable in the direction of the exhaust flow in an opened position.

Turning to FIGS. 3a and 3b a view of the two channels 8, 9 of a dual turbo, for example, and wall 5 is shown with the displaceable wall 5b in a closed position, FIG. 3a, and an open position, FIG. 3b with the openings 5a allowing communication between the first channel and second channel. A shut-off element 15 is provided in the turbine housing to move the displaceable wall 5b. The movement of the displaceable wall is shown in the direction along the exhaust flow direction by way of example. As another example, the displaceable wall may be moved in a direction along the axis of rotation of the rotor, not shown in FIGS. 3a and 3b.

Figure 4A:
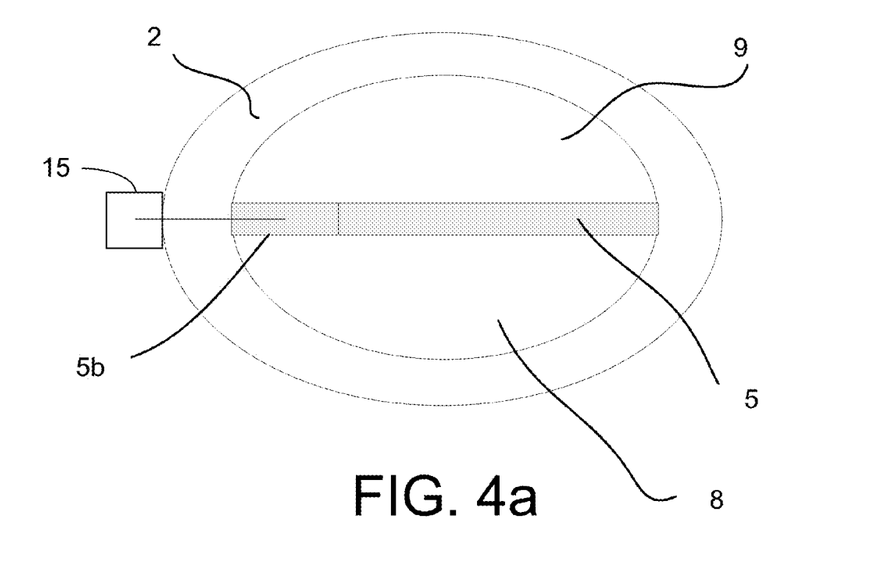
FIG. 4a schematically shows a displaceable wall part movable along the axis of rotation in a closed position.
Figure 4B:
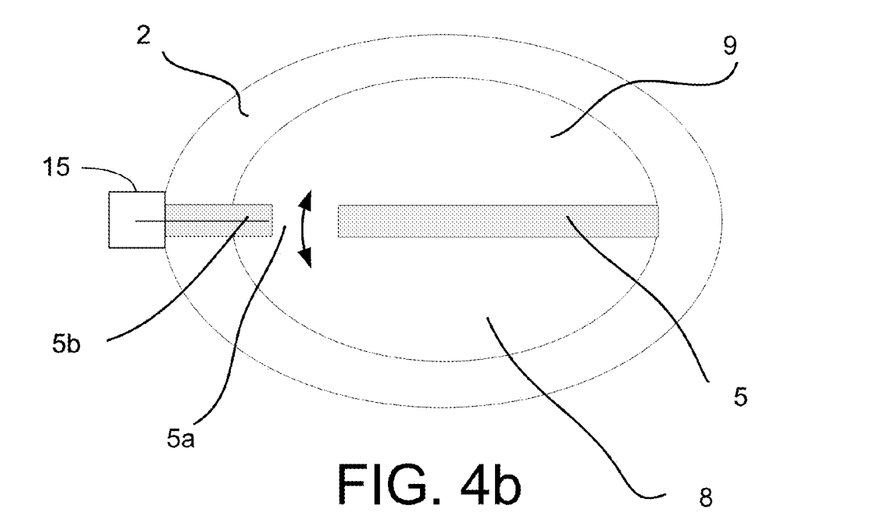
FIG. 4b schematically shows a displaceable wall part movable along the axis of rotation in an opened position.

Turning to FIGS. 4a and 4b a view of the two channels 8, 9 of a dual turbo, for example, and a wall 5 is shown with the displaceable wall 5b in a closed position, FIG. 4a, and an open position, FIG. 4b, with the opening 5a allowing communication between the first channel and second channel. A shut off element 15 is provided to move the displaceable wall 5b. Further, at least one displaceable wall 5b may be controlled by a single shut off element 15. The movement of the displaceable wall is shown in the direction along the axis of rotation of the rotor by way of example. As another example, the displaceable wall may be moved in a direction along the exhaust flow direction, not shown in FIGS. 4a and 4b.

Figure 5:
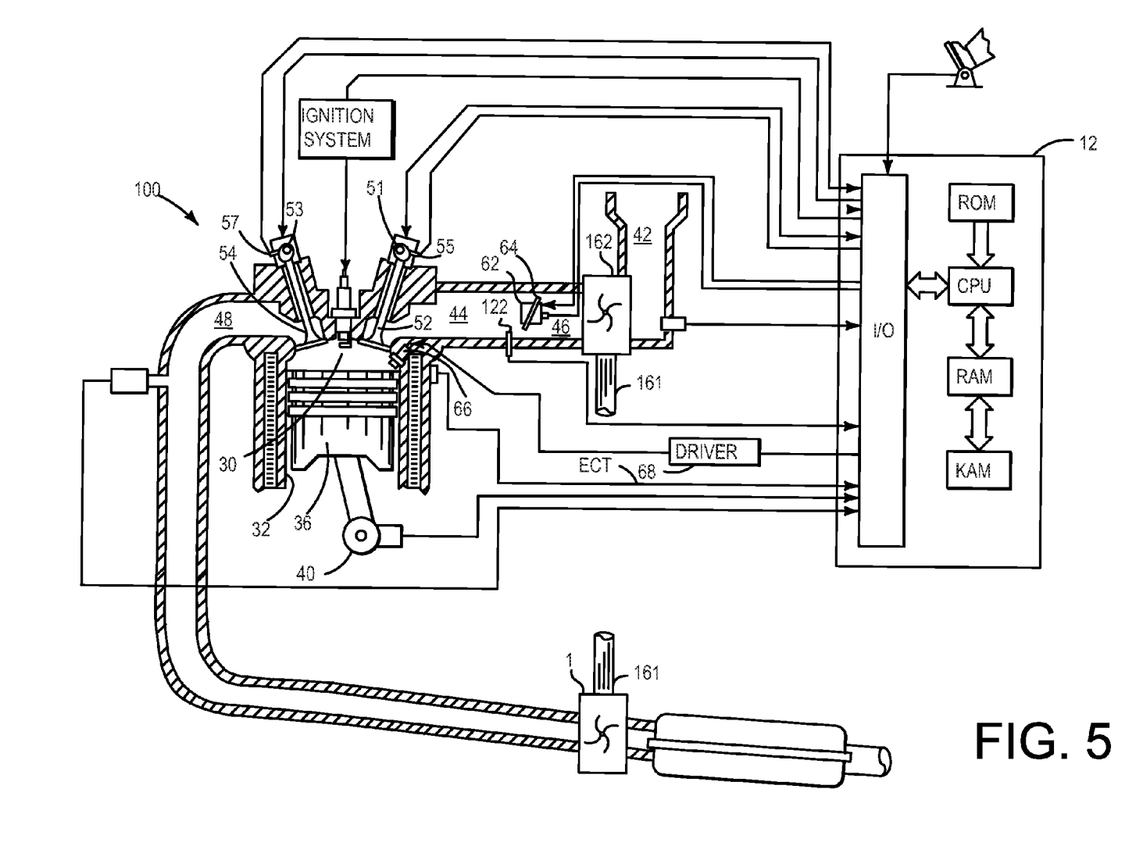
FIG. 5 schematically shows an example of an internal combustion engine.

Turning to FIG. 5 a schematic of an internal combustion engine 100 that may be operated with a two-channel turbine 1 is shown. A plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valves may be operated by an electrochemically controlled valve coil and armature assembly. The position of intake cam 51 is determined by the intake cam sensor 55, and the position of the exhaust cam 53 is determined by the exhaust cam sensor 57. Fuel injector 66 is shown positioned to inject fuel directly into cylinder 30, which is known to those skilled in the art as direct injection. Further, fuel may be injected to an intake port. Fuel is delivered by a fuel system (not shown) to fuel injector 66. Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin the two-channel turbine 1 which is coupled to compressor 162 via shaft 161. It will be appreciated that the turbine 1 is generically depicted via a box. As discussed in FIG. 1 the turbine 1 has greater complexity and may be a dual-channel or twin-flow turbine for example. Further, controller 12 may include a program to operate the at least one movable wall section 5b.

Figure 6:
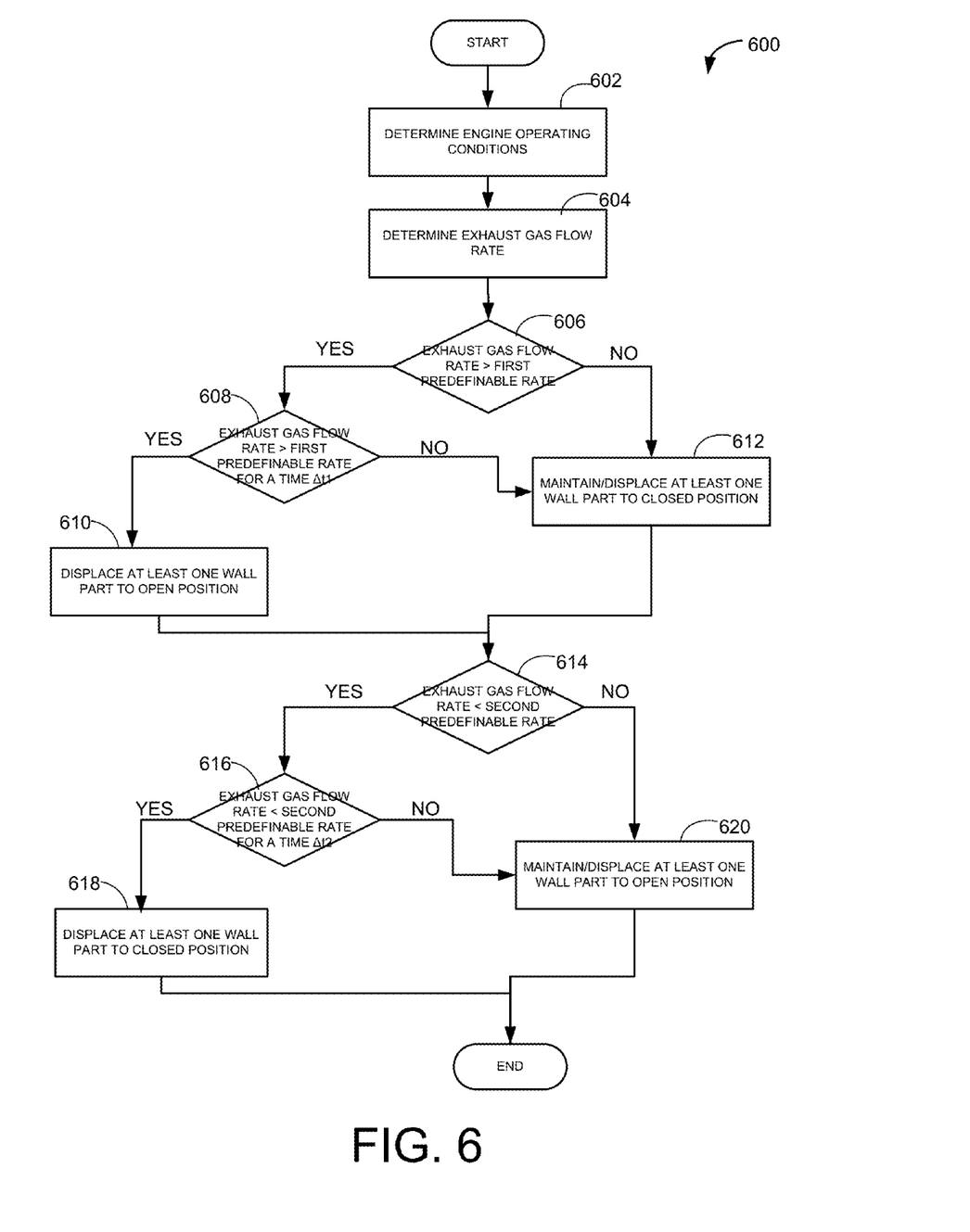
FIG. 6 shows an example method to operate a displaceable wall part.

Turning to FIG. 6 an example method is shown to operate a supercharged engine with a two-channel turbine comprising at least one displaceable wall in the housing wall upstream of the rotor and downstream of the inlets. At 602 the method may determine the engine operating conditions. This may include engine speed, engine load, charge pressure on inlet side, etc.

At 604 the method may determine the exhaust gas flow rate based on the engine operating conditions determine at 602. The method may further determine if the engine used is with quantity regulation, quality regulation, supercharged, etc. in order to determine the exhaust gas flow rate.

At 606 the method may determine if the exhaust flow rate is above a first threshold. If no at 606, the method may proceed to 612 and maintain or displace the at least one displaceable wall part to a closed position.

If yes at 606, the method may proceed to 608 and determine if the exhaust gas flow rate stayed above the first threshold for a time period Δt1. The time period reduces an excessively frequent mode change between impulse supercharging (i.e. the rest position) and ram supercharging (i.e. the first or second position). If no at 606, the method may proceed to 612 and maintain or displace the at least one displaceable wall part to a closed position. If yes at 606, the method may proceed to 610 and displace the at least one wall part to an open position.

At 614 the method may determine if the exhaust flow rate is below a second threshold. If no at 614, the method may proceed to 620 and maintain or displace the at least one displaceable wall part to an open position.

If yes at 614, the method may proceed to 616 and determine if the exhaust gas flow rate stayed above the first threshold for a time period Δt2. If no at 616, the method may proceed to 620 and maintain or displace the at least one displaceable wall part to an opened position. If yes at 616, the method may proceed to 618 and displace the at least one wall part to a closed position.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

The invention claimed is:

1. A supercharged internal combustion engine, comprising:
at least one cylinder head with at least two cylinders, in which each cylinder has at least one outlet opening for discharging exhaust gases out of the cylinder, and each outlet opening is adjoined by an exhaust line;
wherein the at least two cylinders are configured in such a way as to form two groups with in each case at least one cylinder;
wherein the exhaust lines of the cylinders of each cylinder group merge in each case to form an overall exhaust line such that an exhaust manifold is formed;
wherein the two overall exhaust lines are connected to a two-channel turbine, which comprises a rotor which is mounted on a rotatable shaft in a turbine housing, such that in each case one overall exhaust line is connected to one of two inlet openings of the turbine, wherein each inlet opening is adjoined by one channel of the turbine, wherein the turbine housing comprises a housing wall and a comb-shaped displaceable wall part, the housing wall having a comb-shaped opening upstream of the rotor and downstream of the inlet openings, and wherein the displaceable wall part is displaceable, via a controller, between a first position and a second position,
wherein in the first position of the displaceable wall part, the two channels are separated from one another as far as the rotor by the housing wall, such that exhaust-gas streams of the two channels are conducted separate from one another to the rotor,
wherein in the second position of the displaceable wall part, the two channels of the turbine are connected to one another within the turbine housing via the comb-shaped opening in the housing wall.

2. The supercharged internal combustion engine as claimed in claim 1, wherein the two-channel turbine is a dual-flow turbine in which the two channels are arranged one on top of the other as viewed in a section perpendicular to an axis of rotation of the rotor and, at least along an arc-shaped segment, enclose the rotor in spiral form at different radii.

3. The supercharged internal combustion engine as claimed in claim 2, wherein the two inlet openings of the dual-flow turbine are arranged in the housing at different radial distances from the shaft of the turbine.

4. The supercharged internal combustion engine as claimed in claim 1, wherein the two-channel turbine is a twin-flow turbine in which the two channels are arranged adjacent to one another and, at least along an arc-shaped segment, enclose the rotor in spiral form at equal radii.

5. The supercharged internal combustion engine as claimed in claim 4, wherein the two inlet openings of the twin-flow turbine are arranged in the housing at the same radial distance from the shaft of the turbine.

6. The supercharged internal combustion engine as claimed in claim 1, wherein the housing wall is fixedly connected to the housing.

7. The supercharged internal combustion engine as claimed in claim 1, wherein the comb-shaped displaceable wall part is displaceable along an axis of rotation of the rotor.

8. The supercharged internal combustion engine as claimed in claim 1, wherein the comb-shaped displaceable wall part is displaceable along a flow direction of the exhaust gas.

9. The supercharged internal combustion engine as claimed in claim 1, wherein the exhaust lines of the cylinders of each cylinder group merge in each case to form an overall exhaust line, such that two exhaust manifolds are formed, within the cylinder head.

10. A method for an engine system, comprising:
during engine operation, with a controller,
determining a flow rate of engine exhaust gas; and
responsive to the flow rate exceeding a threshold, adjusting a comb-shaped displaceable wall part to an opened position to thereby open a comb-shaped opening in a housing wall of a turbine housing upstream of a rotor and downstream of inlet openings of the turbine housing, wherein when the displaceable wall part is in the opened position, two channels of the turbine housing are fluidly connected via the opening.

11. The method as claimed in claim 10 wherein the displaceable wall part is adjusted to the opened position in a flow direction of the exhaust gas.

12. The method as claimed in claim 10 further comprising adjusting the displaceable wall part to the opened position when the exhaust gas flow rate is above the threshold for a first predefined time period.

13. The method as claimed in claim 12 wherein the threshold is a first threshold, the method further comprising, with the controller, adjusting the displaceable wall part to a closed position which closes the opening in the housing wall when the exhaust rate is below a second threshold, the second threshold lower than the first threshold.

14. The method as claimed in claim 13 further comprising adjusting the displaceable wall part to the closed position when the exhaust gas flow rate is above the second threshold for a second predefined time period.

15. A method for an engine system, comprising:
during engine operation, with a controller,
determining a flow rate of engine exhaust gas;
displacing a comb-shaped displaceable turbocharger housing wall part to cover a comb-shaped opening in a housing wall when the exhaust gas flow rate is below a second threshold; and
adjusting the displaceable wall part to uncover the opening in the housing wall when the exhaust gas flow rate is above a first threshold, the first threshold higher than the second threshold.

16. A method as claimed in claim 15 wherein the displaceable wall part is switched in a continuously variable fashion via an electronic engine controller coupled to the engine.

* * * * *